(12) United States Patent
Feng

(10) Patent No.: US 12,183,128 B2
(45) Date of Patent: Dec. 31, 2024

(54) TESTING METHOD FOR AUTOMATED DRIVING SYSTEM, ELECTRONIC DEVICE AND STORAGE MEDIUM

(71) Applicant: Beijing Baidu Netcom Science and Technology Co., LTD., Beijing (CN)

(72) Inventor: Xi Feng, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 650 days.

(21) Appl. No.: 17/342,207

(22) Filed: Jun. 8, 2021

(65) Prior Publication Data

US 2021/0295613 A1 Sep. 23, 2021

(30) Foreign Application Priority Data

Dec. 17, 2020 (CN) .......................... 202011500891.9

(51) Int. Cl.
*G07C 5/04* (2006.01)
*G05D 1/00* (2024.01)
*G06F 11/36* (2006.01)

(52) U.S. Cl.
CPC ............. *G07C 5/04* (2013.01); *G05D 1/0212* (2013.01); *G06F 11/3688* (2013.01)

(58) Field of Classification Search
CPC ...... G07C 5/04; G05D 1/0212; G06F 11/3688
See application file for complete search history.

(56) References Cited

U.S. PATENT DOCUMENTS

2010/0189131 A1* 7/2010 Branam ........... H04N 21/44016
375/E7.026
2018/0292830 A1* 10/2018 Kazemi ................ G05D 1/0221
(Continued)

FOREIGN PATENT DOCUMENTS

CN 207081682 U 3/2018
CN 109612500 A 4/2019
(Continued)

OTHER PUBLICATIONS

Extended European Search Report received for European Patent Application No. 21178378.2 mailed on Dec. 1, 2021, 8 pages.
(Continued)

*Primary Examiner* — Azizul Choudhury
(74) *Attorney, Agent, or Firm* — MORRISON & FOERSTER LLP

(57) ABSTRACT

A testing method for an automated driving system, an electronic device and a storage medium are provided, and relate to the technical field of artificial intelligence, such as intelligent transportation and automated driving. The method includes: acquiring record data of a sensor device, the record data including a plurality of frames of data collected by the sensor device of a vehicle, each frame of data including a timestamp, and a first frame and a last frame of the record data corresponding to a same vehicle position; and writing the record data repeatedly to generate test data for testing the automated driving system; and updating the timestamp of each frame of data in the record data in the process of repeated writing, according to a number of times of a current repeated writing and a time duration corresponding to the record data.

17 Claims, 6 Drawing Sheets

(56) References Cited

U.S. PATENT DOCUMENTS

| | | | | |
|---|---|---|---|---|
| 2018/0364657 A1* | 12/2018 | Luo | ...................... | G05D 1/0221 |
| 2018/0365533 A1* | 12/2018 | Sathyanarayana | ... | G08G 1/0129 |
| 2019/0236058 A1 | 8/2019 | Satyashiva et al. | | |
| 2019/0329771 A1* | 10/2019 | Wray | ...................... | G08G 1/166 |
| 2020/0249675 A1* | 8/2020 | Kim | ...................... | B60W 60/00 |
| 2020/0406894 A1* | 12/2020 | Akella | .................. | B60W 10/18 |
| 2021/0237772 A1* | 8/2021 | Meltz | ...................... | G06F 30/20 |
| 2022/0146676 A1* | 5/2022 | Armstrong-Crews | ....................... G01S 17/931 | |

FOREIGN PATENT DOCUMENTS

| | | |
|---|---|---|
| CN | 110795813 A | 2/2020 |
| CN | 111090915 A1 | 5/2020 |
| CN | 111142129 A | 5/2020 |
| CN | 111580493 A | 8/2020 |
| CN | 111638060 A1 | 9/2020 |
| CN | 112015838 A | 12/2020 |
| EP | 3620959 A1 | 3/2020 |
| WO | WO-2020147496 A1 | 7/2020 |

OTHER PUBLICATIONS

Weiss et al., (2020) "DeepRacing: Parameterized Trajectories for Autonomous Racing," ArXiv, 2005.05178, 29 pages.

Xiu, (2019). "Thesis: Study on the Test and Comprehensive Evaluation of Conditional Autonomous Vehicles," Chongqing University, 91 pages. English Abstract Only.

Office Action and Search Report received for Chinese Patent Application No. 2020115008919 issued on Mar. 29, 2022, 10 pages.

\* cited by examiner

TESTING METHOD FOR AUTOMATED DRIVING SYSTEM, ELECTRONIC DEVICE AND STORAGE MEDIUM

CROSS-REFERENCE TO RELATED APPLICATION

This application claims priority to Chinese Patent Application No. 202011500891.9, filed on Dec. 17, 2020, which is hereby incorporated by reference in its entirety.

TECHNICAL FIELD

The present disclosure relates to the technical field of automated driving, in particular to the performance testing field of an automated driving system.

BACKGROUND

HiL (Hardware in the Loop) technology is a simulation testing technology that may be used for virtual simulation testing of a self-driving vehicle. A vehicle-mounted computing platform of the self-driving vehicle can be virtually tested by using the HiL technology, thus greatly improving a testing efficiency of the self-driving vehicle.

When the HiL technology is used for performing stimulation testing on the self-driving vehicle, data collected by a sensor device of the self-driving vehicle during road driving may be used. Necessary transformation is performed on the data collected by the sensor device (this process may be called inversion), and then the transformed data is input into the vehicle-mounted computing platform of the self-driving vehicle to check performances of the vehicle-mounted computing platform.

SUMMARY

The present disclosure provides a testing method and apparatus for an automated driving system, an electronic device and a storage medium.

According to one aspect of the present disclosure, there is provided a testing method for an automated driving system, including:
  acquiring record data of a sensor device, the record data including a plurality of frames of data collected by the sensor device of a vehicle, each frame of data including a timestamp, and a first frame and a last frame of the record data corresponding to a same vehicle position; and
  writing the record data repeatedly to generate test data for testing the automated driving system; and updating the timestamp of each frame of data in the record data in the process of repeated writing, according to a number of times of a current repeated writing and a time duration corresponding to the record data.

According to another aspect of the present disclosure, there is provided a testing apparatus for an automated driving system, including:
  an acquisition module configured for acquiring record data of a sensor device, the record data including a plurality of frames of data collected by the sensor device of a vehicle, each frame of data including a timestamp, and a first frame and a last frame of the record data corresponding to a same vehicle position; and
  a test data generating module configured for writing the record data repeatedly to generate test data for testing the automated driving system; and updating the timestamp of each frame of data in the record data in the process of repeated writing, according to a number of times of a current repeated writing and a time duration corresponding to the record data.

According to another aspect of the present disclosure, there is provided an electronic device, including:
  at least one processor; and
  a memory communicatively connected to the at least one processor; wherein,
  the memory stores instructions executable by the at least one processor, the instructions being executed by the at least one processor to enable the at least one processor to perform the method in any embodiment of the present disclosure.

According to another aspect of the present disclosure, there is provided a non-transitory computer-readable storage medium storing computer instructions for causing a computer to perform the method in any embodiment of the present disclosure.

According to another aspect of the present disclosure, there is provided a computer program product including a computer program which, when executed by a processor, implements the method in any embodiment of the present disclosure.

It is to be understood that the contents in this section are not intended to identify the key or critical features of the embodiments of the present disclosure, and are not intended to limit the scope of the present disclosure. Other features of the present disclosure will become readily apparent from the following description.

BRIEF DESCRIPTION OF THE DRAWINGS

The drawings are included to provide a better understanding of the present disclosure and are not to be construed as limiting the present disclosure. Wherein.

DETAILED DESCRIPTION

Reference will now be made in detail to the exemplary embodiments of the present disclosure, examples of which are illustrated in the accompanying drawings, wherein the various details of the embodiments of the present disclosure are included to facilitate understanding and are to be considered as exemplary only. Accordingly, a person skilled in the art should appreciate that various changes and modifications can be made to the embodiments described herein without departing from the scope and spirit of the present disclosure. Also, descriptions of well-known functions and structures are omitted from the following description for clarity and conciseness.

To test a vehicle-mounted computing platform of a self-driving for a long time, long-time sensor data is required. Limited to a continuous operation time of an automated driving system, a longest time of general sensor data is about 3 hours, which cannot meet the requirements on a long-time operation stability test of the vehicle-mounted computing platform. If a piece of sensor data is found from a data platform and continuously played for a plurality of times, although the requirement on duration can be met, position and time hopping of the data will occur. For example, a piece of sensor data with a duration of 3 hours is selected. If the data is played 4 times continuously, a piece of data with a duration of 12 hours will be obtained. However, position and time hopping will occur at a junction of two adjacent playing, that is, at the points in time of 3:00:00, 6:00:00 and 9:00:00 of the whole duration, which will cause positioning to be misaligned, so the data cannot be used to test the automated driving system.

Figure 1:
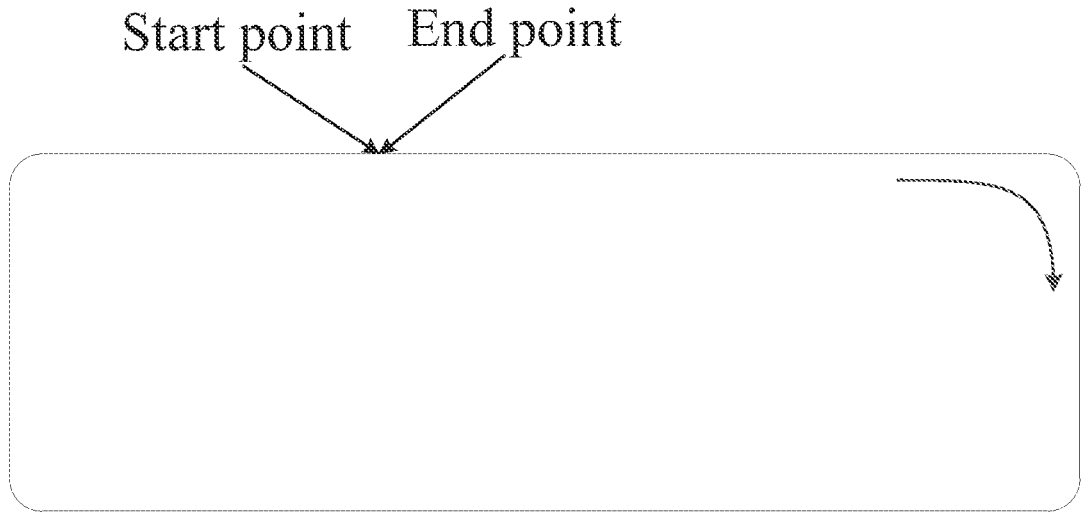
FIG. 1 is a schematic diagram of a driving route corresponding to record data used in the present disclosure.

In order to solve the problem of position hopping, the present disclosure adopts record data with the same starting point and end point, and plays the record data repeatedly for a plurality of times, so that the position on the junction of the two adjacent playing can be guaranteed to be the same, and position hopping can be avoided. FIG. 1 is a schematic diagram of a driving route corresponding to the record data used in the present disclosure. As shown in FIG. 1, a starting point and an end point of the driving route are the same point, and the position hopping can be avoided by repeatedly playing the record data of the driving route.

In order to solve the problem of time hopping, the simplest way is to replace a timestamp corresponding to a historical time in each frame of data in the record data with the timestamp corresponding to the current time. For example, a timestamp of a first frame of data in the record data is replaced with a timestamp corresponding to the current test time, and a timestamp of a second frame data in the record data is replaced with a timestamp corresponding to next frame of the current test time. In this way, the timestamps in each frame of data are sequentially replaced. However, this method requires very high time accuracy, and there are many difficulties in concrete implementation. Through in-depth analysis on simulation testing, the present disclosure proposes that: a core of the problem is not that the repeatedly written record data does not correspond to the current time (i.e., the test time), but that the timestamps of each frame in the repeatedly written record data are discontinuous. Therefore, as long as the timestamps of each frame in the repeatedly written record data are continuous, the problem of time hopping can be solved. Meanwhile, the method for replacing the timestamp of each frame of data in the record data with the timestamp corresponding to the current time is avoided, which is more convenient in concrete implementation.

Figure 2:
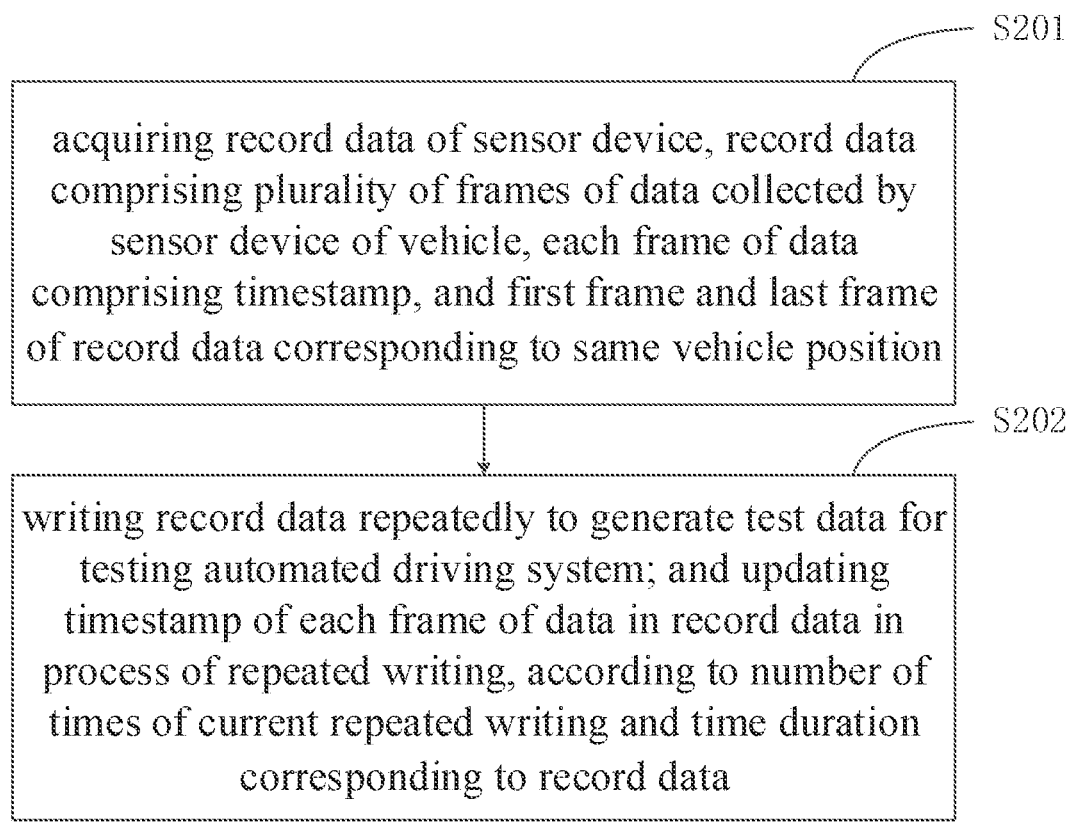
FIG. 2 is a flowchart for implementing a testing method for an automated driving system according to the present disclosure.

On the basis of the above analysis, the present disclosure provides a testing method for an automated driving system. FIG. 2 is a flowchart for implementing the testing method for the automated driving system according to the present disclosure, including the following steps.

In step S201, record data of a sensor device is acquired, the record data including a plurality of frames of data collected by the sensor device of a vehicle, each frame of data including a timestamp, and a first frame and a last frame of the record data corresponding to a same vehicle position.

In step S202, the record data is written repeatedly to generate test data for testing the automated driving system; and the timestamp of each frame of data in the record data is updated in the process of repeated writing, according to a number of times of a current repeated writing and a time duration corresponding to the record data.

It is assumed that the record data (i.e., raw data) collected by the sensor device of the vehicle includes N frames, and the serial number of each frame of data is 1 to N in turn. If the record data is written 4 times repeatedly, the generated test data includes N*4 frames. Because the test data is generated by repeated writing, the first to $N^{th}$ frames of the test data have the same contents as that of the first to $N^{th}$ frames of the record data, the $(N+1)^{th}$ to $2N^{th}$ frames of the test data have the same contents as that of the first to $N^{th}$ frames of the record data, the $(2N+1)^{th}$ to $3N^{th}$ frames of the test data have the same contents as that of the first to $N^{th}$ frames of the record data, and the $(3N+1)^{th}$ to $4N^{th}$ frames of the test data have the same contents as that of the first to $N^{th}$ frames of the record data. As described in step S201, the vehicle positions corresponding to the first frame and the last frame of the record data are the same, so position hopping will not occur to the generated test data at a repeatedly written connection position. In other words, the vehicle position corresponding to the $N^{th}$ frame is the same as that corresponding to the $(N+1)^{th}$ frame, the vehicle position corresponding to the $2N^{th}$ frame is the same as that corresponding to the $(2N+1)^{th}$ frame, and the vehicle position corresponding to the $3N^{th}$ frame is the same as that corresponding to the $(3N)^{th}$ frame.

Figure 3A:
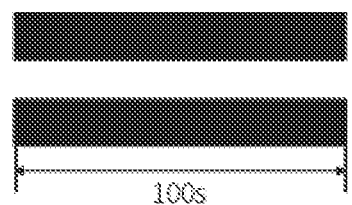
FIG. 3A is a schematic diagram of record data according to the present disclosure.
Figure 3B:
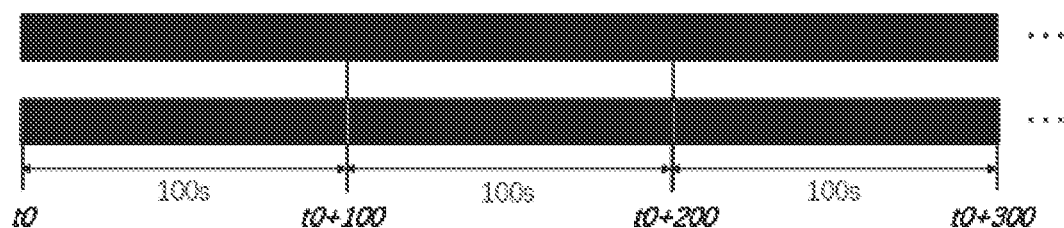
FIG. 3B is a schematic diagram of test data according to the present disclosure.

The above step S202 solves the problem of time hopping. Description is made with reference to FIG. 3A and FIG. 3B, wherein FIG. 3A is a schematic diagram of record data according to the present disclosure. In FIG. 3A, two pieces of record data collected by a positioning sensor and a radar are included, and a corresponding time duration is 100 seconds. FIG. 3B is a schematic diagram of test data according to the present disclosure, wherein the test data is obtained by repeatedly writing the record data in FIG. 3A, and the timestamp of each frame of data in the record data is updated during every repeated writing according to the number of times of the current repeated writing and the time duration corresponding to the record data. As shown in FIG. 3B, a timestamp corresponding to the first frame of the original record data is t0, and the timestamp of the first frame is updated to t0+100s during the first repeated writing. In the second repeated writing, the timestamp of the first frame is updated to t0+200s, and so on. Other frames are replaced in the same way. In this way, the timestamp of each frame in the finally generated test data can be guaranteed to be continuous, and the problem of time hopping is solved.

According to the present disclosure, by repeatedly writing the record data of the sensor device and replacing the timestamp in the writing process, a time continuity between data frames is ensured; moreover, the record data with the same starting point and end point positions is adopted to ensure a position continuity between the data frames; Therefore, test data with sufficient duration and no position and time hopping can be generated, and the long-time operation stability test of the automated driving system can be implemented.

Figure 4:
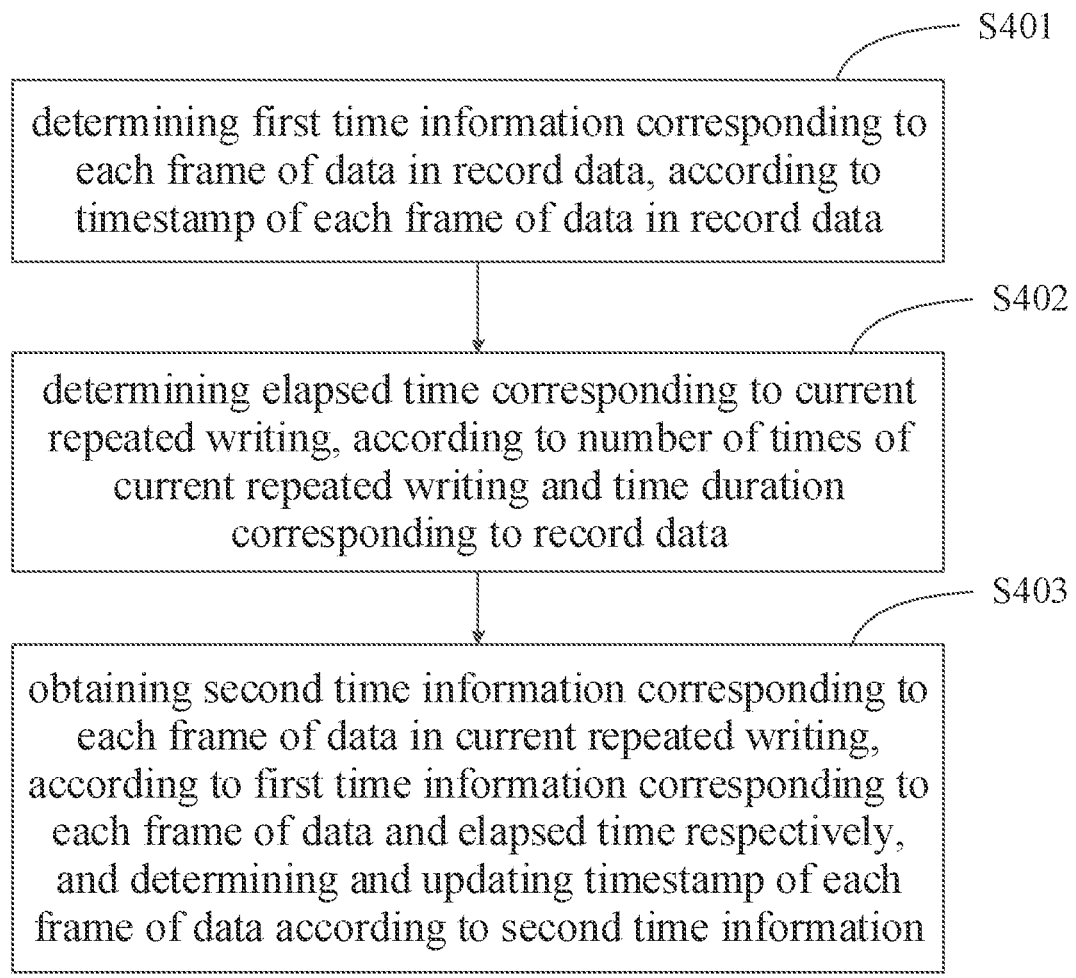
FIG. 4 is a flowchart of implementing a method for updating a timestamp in the process of repeated writing in the testing method for the automated driving system according to the present disclosure.

FIG. 4 is a flowchart of implementing the method for updating the timestamp in the process of repeated writing in the testing method for the automated driving system according to the embodiments of the present disclosure, including the following steps.

In step S401, according to the timestamp of each frame of data in the record data, first time information corresponding to each frame of data in the record data is determined.

In step S402, elapsed time corresponding to the current repeated writing is determined, according to the number of times of the current repeated writing and the time duration corresponding to the record data. For example, if it is the $N^{th}$ repeated writing and the time duration corresponding to the record data is T, then it is determined that the elapsed time corresponding to the $N^{th}$ repeated writing is N*T.

In step S403, according to the first time information corresponding to each frame of data and the elapsed time mentioned above respectively, second time information corresponding to each frame of data in the current repeated writing is obtained, and the timestamp of each frame of data is determined and updated according to the second time information.

After generating the above test data, the embodiments of the present disclosure may further test a vehicle-mounted computing platform of a self-driving vehicle by using the test data.

Optionally, a header and/or a body of each frame of data mentioned above contains the timestamp.

Implementation methods of replacing the above timestamp are described in detail by taking two sensor devices as examples.

In one positioning sensor, time information is expressed by a GPS time system. In the GPS time system, an atomic time AT1 second is used as a time reference, wherein the second is defined as a duration of 9,192,631,170 periods of radiation corresponding to the transition between two hyperfine levels of a ground state of a caesium atom CS133, and a time origin starts at $0^h$ UTC on Jan. 6, 1980. In the record data of the positioning sensor, a timestamp of each frame of data is included in a header and a body of the frame of data. The timestamp in the header occupies 6 bytes, wherein 2 bytes represent GPS week, and the other 4 bytes represent GPS millisecond (GPS ms) within the GPS week. The timestamp in the body occupies 12 bytes, wherein 4 bytes represent GPS week, and the other 8 bytes represent GPS second (GPS s) within the GPS week. For each frame of data, the timestamp can be changed by changing the GPS weeks and the GPS milliseconds (second) in the header and the body. For example, it is assumed that a time duration of the record data is T. At first, the GPS week and GPS ms of the current frame are acquired, and the updated GPS week and GPS ms at the corresponding time are calculated at the $n^{th}$ repeated writing, that is, after nT seconds. Then, a time at a position specified in the header is replaced with the updated GPS week and GPS ms, and the GPS time in the body is replaced after the GPS ms is converted into GPS s.

In one laser radar, time information is expressed by a unix time system. The unix time is the number of seconds elapsed since Jan. 1, 1970; and leap seconds are ignored. In the record data of the laser radar, each frame of point cloud data consists of 1,240 bytes of measured data and 22 bytes of additional information, and the last 6 bytes of the additional information contain a timestamp. It is assumed that a time duration of the record data is T. For each frame of the original record data, firstly, according to the contents of the last 6 bytes, a unix timestamp t0 at that time is calculated, and the unix timestamp is modified to t0+nT during the $n^{th}$ repeated writing to replace the timestamp.

Figure 5:
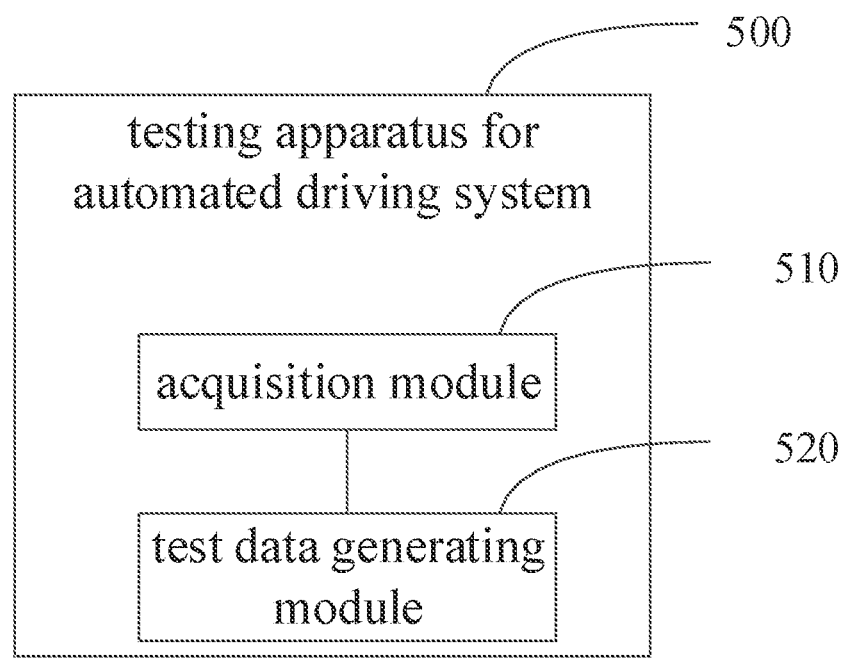
FIG. 5 is a schematic structural diagram of a testing apparatus 500 for an automated driving system according to the present disclosure.

The embodiments of the present disclosure further provide a testing apparatus for an automated driving system. FIG. 5 is a schematic structural diagram of a testing apparatus 500 of the automated driving system according to the present disclosure, including:

an acquisition module 510 configured for acquiring record data of a sensor device, the record data including a plurality of frames of data collected by the sensor device of a vehicle, each frame of data including a timestamp, and a first frame and a last frame of the record data corresponding to a same vehicle position; and a test data generating module 520 configured for writing the record data repeatedly to generate test data for testing the automated driving system; and updating the timestamp of each frame of data in the record data in the process of repeated writing, according to a number of times of the current repeated writing and a time duration corresponding to the record data.

Figure 6:
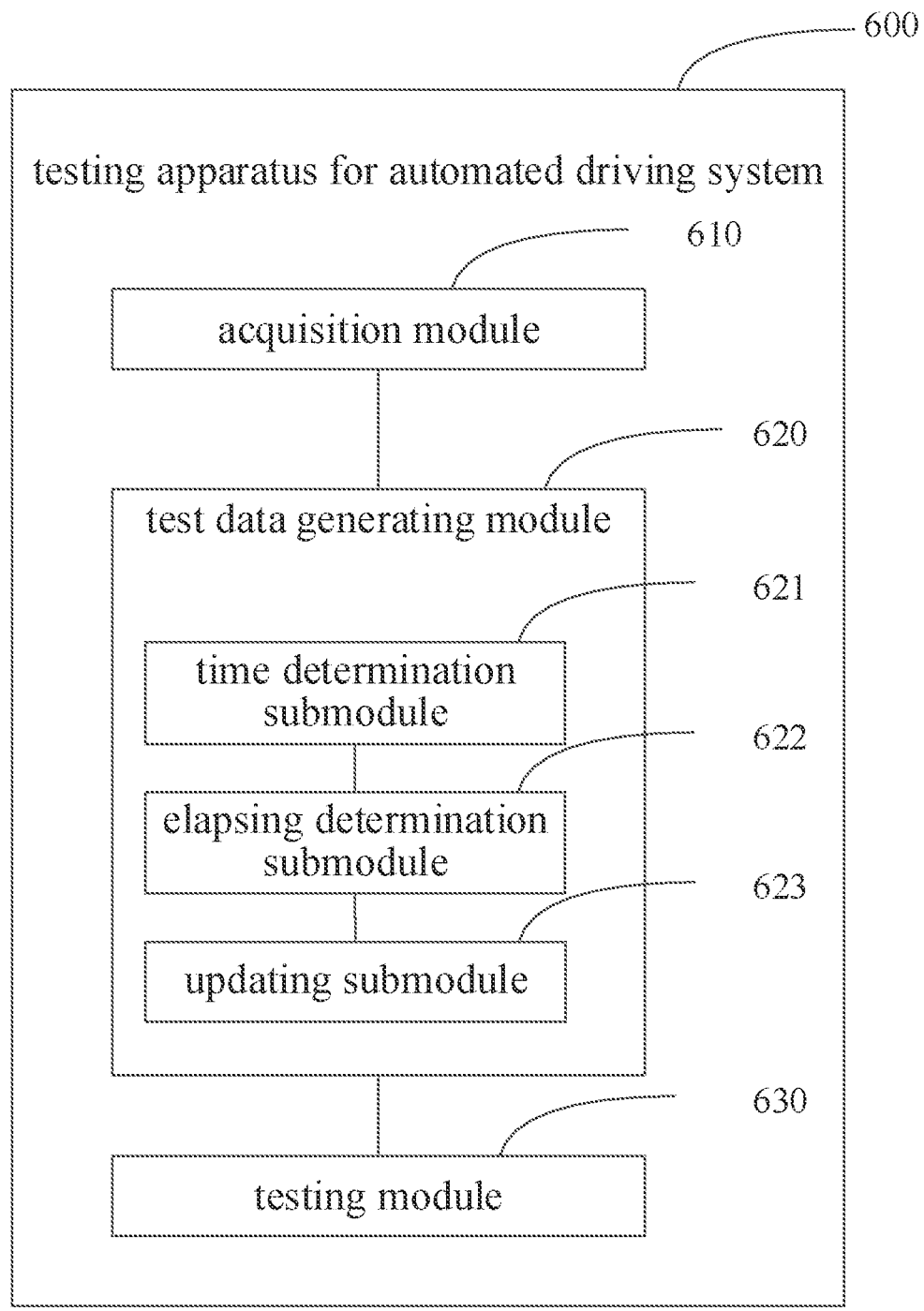
FIG. 6 is a schematic structural diagram of a testing apparatus 600 for an automated driving system according to the present disclosure.

FIG. 6 is a schematic structural diagram of a testing apparatus 600 of an automated driving system according to an embodiment of the present disclosure. The testing apparatus 600 includes an acquisition module 610 and a test data generating module 620 which are the same as the above-mentioned acquisition module 510 and test data generating module 520. As shown in FIG. 6, the above-mentioned test data generating module 620 may include:

a time determination submodule 621 configured for determining first time information corresponding to each frame of data in the record data, according to the timestamp of each frame of data in the record data;

an elapsing determination submodule 622 configured for determining elapsed time corresponding to the current repeated writing, according to the number of times of a current repeated writing and the time duration corresponding to the record data; and an updating submodule 623 configured for obtaining second time information corresponding to each frame of data in the current repeated writing, according to the first time information corresponding to each frame of data and the elapsed time respectively, and determining and updating the timestamp of each frame of data according to the second time information.

As shown in FIG. 6, the above-mentioned apparatus may also include:

a testing module 630 configured for testing a vehicle-mounted computing platform of a self-driving vehicle by using the test data.

Optionally, a header and/or a body of each frame of data mentioned above contains the timestamp.

Functions of each module in each apparatus in the embodiments of the present disclosure may be referred to the corresponding description in the above methods, and will not be elaborated herein.

According to the embodiments of the present disclosure, the present disclosure further provides an electronic device, a readable storage medium and a computer program product.

Figure 7:
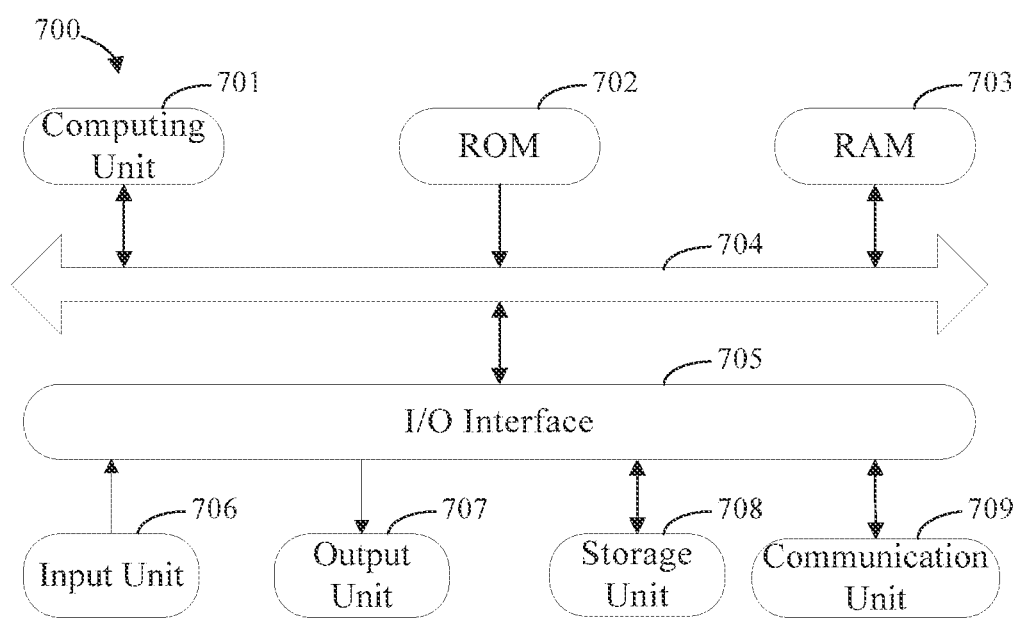
FIG. 7 is a block diagram of an electronic device for implementing a testing method for an automated driving system according to the present disclosure.

FIG. 7 is a schematic block diagram of an electronic device of an example electronic device 700 that may be used to implement the embodiments of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital processing, cellular telephones, smart phones, wearable devices, and other similar computing devices. The components shown herein, their connections and relationships, and their functions are by way of example only and are not intended to limit the implementations of the present disclosure described and/or claimed herein.

As shown in FIG. 7, the electronic device 700 includes a computing unit 701, which can perform various appropriate actions and processes according to a computer program stored in a Read-only Memory (ROM) 702 or a computer program loaded from a storage unit 708 into a Random Access Memory (RAM) 703. In the RAM 703, various programs and data needed for operating the device 700 may also be stored. The computing unit 701, the ROM 702, and the RAM 703 are connected to each other through a bus 704. An Input/Output (I/O) interface 705 is also connected to the bus 704.

A plurality of components in the device 700 are connected to the I/O interface 705, including: an input unit 706, such as a keyboard, a mouse, and the like; an output unit 707, such as various types of displays, speakers, and the like; a storage unit 708, such as a magnetic disk, an optical disk, and the like; and a communication unit 709, such as a network card, a modem, a wireless communication transceiver, and the like. The communication unit 709 allows the device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include, but are not limited to, a Central Processing Unit (CPU), a Graphics Processing Unit (GPU), various dedicated Artificial Intelligence (AI) computing chips, various computing units running machine learning model algorithms, a Digital Signal Processor (DSP), and any suitable processor, controller, microcontroller, etc. The computing unit 701 executes various methods and processes described above, such as the testing method for the automated driving system. For example, in some embodiments, the testing method for the automated driving system may be implemented as a computer software program, which is tangibly embodied in a machine-readable medium, such as the storage unit 708. In some embodiments, a part or all of the computer program may be loaded and/or installed on the device 700 via the ROM 702 and/or the communication unit 709. When the computer program is loaded into the RAM 703 and executed by the computing unit 701, one or more steps of the testing method for the automated driving system described above may be executed. Alternatively, in other embodiments, the computing unit 701 may be configured to execute the testing method for the automated driving system by any other suitable means (for example, by means of firmware).

Various embodiments of the systems and techniques described above herein may be implemented in digital electronic circuit systems, integrated circuit systems, Field Programmable Gate Arrays (FPGAs), Application Specific Integrated Circuits (ASICs), Application Specific Standard Products (ASSPs), Systems on Chip (SOCs), Complex Programmable Logic Devices (CPLDs), computer hardware, firmware, software, and/or combinations thereof. These various embodiments may include: implementation in one or more computer programs which may be executed and/or interpreted on a programmable system including at least one programmable processor, and the programmable processor may be a dedicated or general-purpose programmable processor which can receive data and instructions from, and transmit data and instructions to, a memory system, at least one input device, and at least one output device.

Program codes for implementing the method of the present disclosure may be written in any combination of one or more programming languages. These program codes may be provided to a processor or controller of a general purpose computer, a special purpose computer, or other programmable data processing device, such that the program codes, when executed by the processor or the controller, enable functions/operations specified in the flowcharts and/or block diagrams to be implemented. The program codes may be executed entirely on a machine, partially executed on the machine, partially executed on the machine as a stand-alone software package, and partially executed on a remote machine, or entirely executed on the remote machine or a server.

In the context of the present disclosure, the machine-readable medium may be a tangible medium which may contain or store a program that may be used by or conjunctively used with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the above. More specific examples of the machine-readable storage medium may include an electrical connection with one or more wires, a portable computer disk, a hard disk, a Random Access Memory (RAM), a Read-only Memory (ROM), an Erasable Programmable Read-only Memory (EPROM or flash memory), an optical fiber, a portable Compact Disk Read-only Memory (CD-ROM), an optical storage device, a magnetic storage device, or any suitable combination of the above contents.

To provide for an interaction with a user, the systems and techniques described herein may be implemented on a computer having: a display device (e.g., a Cathode Ray Tube (CRT) or Liquid Crystal Display (LCD) monitor) for displaying information to a user; and a keyboard and a pointing device (e.g., a mouse or a trackball) by which a user can provide input to the computer. Other types of devices may also be used to provide interaction with a user; for example, the feedback provided to the user may be any form of sensory feedback (e.g., visual feedback, audile feedback, or tactile feedback); and input from the user may be received in any form, including acoustic input, audio input, or tactile input.

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background component, middleware component, or front-end component. The components of the system may be interconnected by digital data communication (e.g., a communication network) of any form or medium. Examples of the communication network include: Local Area Networks (LANs), Wide Area Networks (WANs), and the Internet.

The computer system may include a client and a server. The client and the server are typically remote from each other and typically interact through a communication network. A relationship between the client and the server is generated by computer programs operating on respective computers and having a client-server relationship with each other.

It will be appreciated that the various forms of flow, reordering, adding or removing steps shown above may be used. For example, the steps recited in the present disclosure may be performed in parallel or sequentially or may be performed in a different order, so long as the desired results of the technical solutions disclosed in the present disclosure can be achieved, and no limitation is made herein.

The above-mentioned embodiments are not to be construed as limiting the scope of protection of the present disclosure. It will be apparent to a person skilled in the art that various modifications, combinations, sub-combinations and substitutions are possible, depending on design requirements and other factors. Any modifications, equivalents, and improvements within the spirit and principles of the present disclosure are intended to be included within the scope of protection of the present disclosure.

What is claimed is:

1. A testing method for an automated driving system, comprising:
    acquiring record data of a sensor device, the record data comprising a plurality of frames of data collected by the sensor device of a vehicle when the vehicle is travelling along a driving route, each frame of data comprising a timestamp, a first frame of the record data corresponding to a starting point of the driving route, and a last frame of the record data corresponding to an end point of the driving route, wherein the starting point and the end point are the same point; and
    writing the record data repeatedly to generate test data for testing the automated driving system, wherein the test data comprises a plurality of copies of a same content of the record data; playing a same record data repeatedly for a plurality of times and updating the timestamp of each frame of the newly written data in the process of repeated writing, according to a number of times of a current repeated writing and a time duration corresponding to the record data, to make the timestamps of each frame in the generated test data continuous and position hopping of the vehicle not occur to the generated test data every time one of the plurality of copies starts to be played, wherein the updating the timestamp of each frame of the newly written data in the process of repeated writing, according to the number of times of the current repeated writing and the time duration corresponding to the record data, comprises:
    determining first time information corresponding to each frame of data in the record data, according to the timestamp of each frame of data in the record data;
    determining elapsed time corresponding to the current repeated writing, according to the number of times of the current repeated writing and the time duration corresponding to the record data; and
    obtaining second time information corresponding to each frame of data in the current repeated writing, according to the first time information corresponding to each frame of data and the elapsed time respectively, and determining and updating the timestamp of each frame of the newly written data according to the second time information.

2. The method of claim 1, further comprising: testing a vehicle-mounted computing platform of a self-driving vehicle by using the test data.

3. The method of claim 2, wherein a header and/or a body of each frame of data contains the timestamp.

4. The method of claim 1, further comprising: testing a vehicle-mounted computing platform of a self-driving vehicle by using the test data.

5. The method of claim 1, wherein a header and/or a body of each frame of data contains the timestamp.

6. The method of claim 1, wherein a header and/or a body of each frame of data contains the timestamp.

7. An electronic device, comprising:
    at least one processor; and
    a memory communicatively connected to the at least one processor; wherein,
    the memory stores instructions executable by the at least one processor to enable the at least one processor to perform operations of:
    acquiring record data of a sensor device, the record data comprising a plurality of frames of data collected by the sensor device of a vehicle when the vehicle is travelling along a driving route, each frame of data comprising a timestamp, a first frame of the record data corresponding to a starting point of the driving route, and a last frame of the record data corresponding to an end point of the driving route, wherein the starting point and the end point are the same point; and
    writing the record data repeatedly to generate test data for testing the automated driving system, wherein the test data comprises a plurality of copies of a same content of the record data; playing a same record data repeatedly for a plurality of times and updating the timestamp of each frame of the newly written data in the process of repeated writing, according to a number of times of a current repeated writing and a time duration corresponding to the record data, to make the timestamps of each frame in the generated test data continuous and position hopping of the vehicle not occur to the generated test data every time one of the plurality of copies starts to be played, wherein the updating the timestamp of each frame of the newly written data in the process of repeated writing, according to the number of times of the current repeated writing and the time duration corresponding to the record data, comprises:
    determining first time information corresponding to each frame of data in the record data, according to the timestamp of each frame of data in the record data;
    determining elapsed time corresponding to the current repeated writing, according to the number of times of the current repeated writing and the time duration corresponding to the record data; and
    obtaining second time information corresponding to each frame of data in the current repeated writing, according to the first time information corresponding to each frame of data and the elapsed time respectively, and determining and updating the timestamp of each frame of the newly written data according to the second time information.

8. The electronic device of claim 7, wherein the instructions are executable by the at least one processor to enable the at least one processor further to perform operation of: testing a vehicle-mounted computing platform of a self-driving vehicle by using the test data.

9. The electronic device of claim 8, wherein a header and/or a body of each frame of data contains the timestamp.

10. The electronic device of claim 7, wherein the instructions are executable by the at least one processor to enable the at least one processor further to perform operation of:

testing a vehicle-mounted computing platform of a self-driving vehicle by using the test data.

11. The electronic device of claim 7, wherein a header and/or a body of each frame of data contains the timestamp.

12. The electronic device of claim 7, wherein a header and/or a body of each frame of data contains the timestamp.

13. A non-transitory computer-readable storage medium storing computer instructions for causing a computer to perform operations of:

acquiring record data of a sensor device, the record data comprising a plurality of frames of data collected by the sensor device of a vehicle when the vehicle is travelling along a driving route, each frame of data comprising a timestamp, a first frame of the record data corresponding to a starting point of the driving route, and a last frame of the record data corresponding to an end point of the driving route, wherein the starting point and the end point are the same point; and writing the record data repeatedly to generate test data for testing the automated driving system, wherein the test data comprises a plurality of copies of a same content of the record data; playing a same record data repeatedly for a plurality of times and updating the timestamp of each frame of the newly written data in the process of repeated writing, according to a number of times of a current repeated writing and a time duration corresponding to the record data, to make the timestamps of each frame in the generated test data continuous and position hopping of the vehicle not occur to the generated test data every time one of the plurality of copies starts to be played, wherein the updating the timestamp of each frame of the newly written data in the process of repeated writing, according to the number of times of the current repeated writing and the time duration corresponding to the record data, comprises:

determining first time information corresponding to each frame of data in the record data, according to the timestamp of each frame of data in the record data;

determining elapsed time corresponding to the current repeated writing, according to the number of times of the current repeated writing and the time duration corresponding to the record data; and obtaining second time information corresponding to each frame of data in the current repeated writing, according to the first time information corresponding to each frame of data and the elapsed time respectively, and determining and updating the timestamp of each frame of the newly written data according to the second time information.

14. The non-transitory computer-readable storage medium of claim 13, wherein the computer instructions are further configured for causing the computer to perform operation of: testing a vehicle-mounted computing platform of a self-driving vehicle by using the test data.

15. The non-transitory computer-readable storage medium of claim 13, wherein the computer instructions are further configured for causing the computer to perform operation of: testing a vehicle-mounted computing platform of a self-driving vehicle by using the test data.

16. The non-transitory computer-readable storage medium of claim 13, wherein a header and/or a body of each frame of data contains the timestamp.

17. The non-transitory computer-readable storage medium of claim 13, wherein a header and/or a body of each frame of data contains the timestamp.

* * * * *